UNITED STATES PATENT OFFICE.

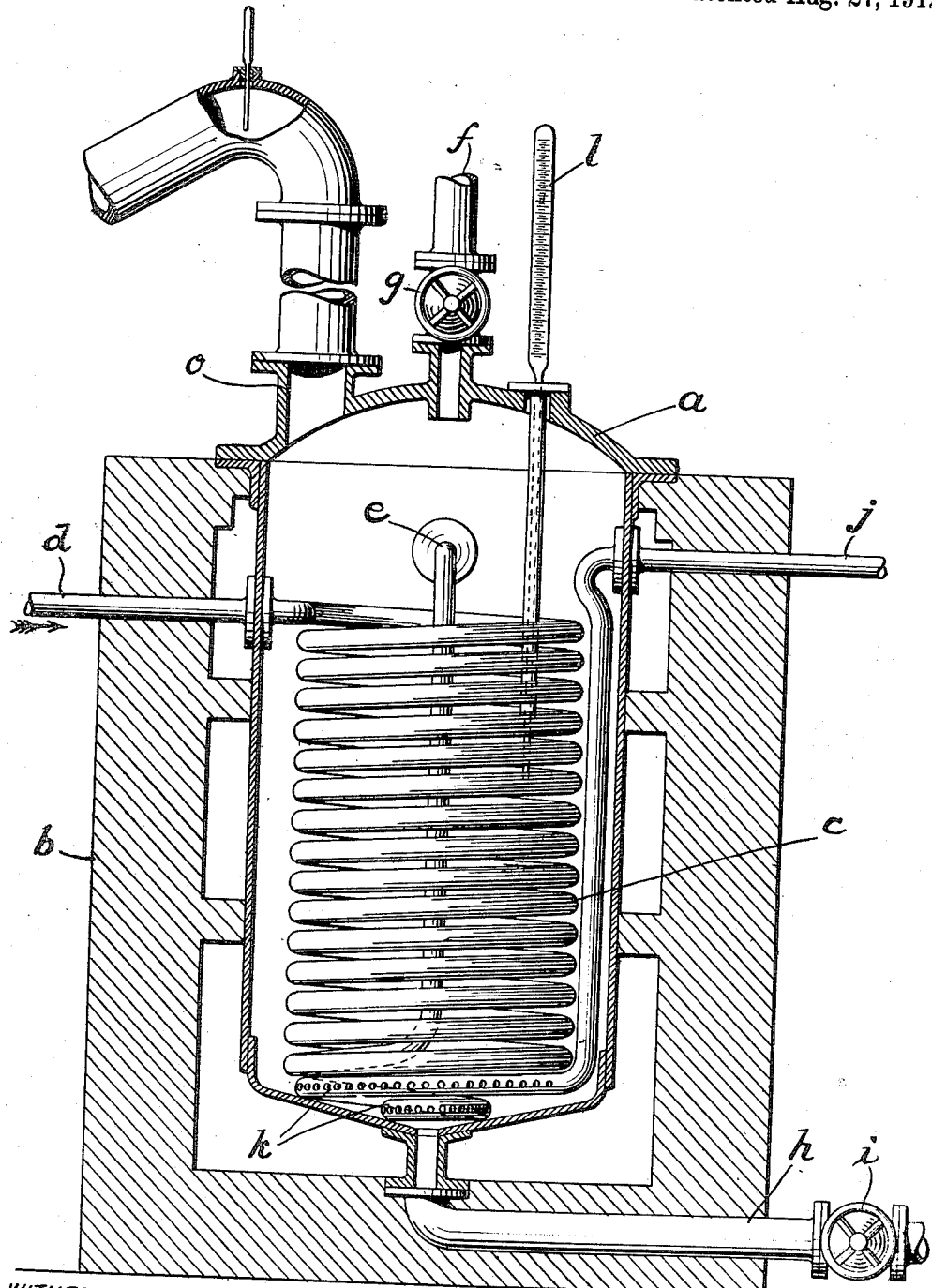

WILLIAM RINTOUL AND ALFRED GEORGE INNES, OF STEVENSTON, SCOTLAND, ASSIGNORS TO E. I. DU PONT DE NEMOURS POWDER COMPANY, OF WILMINGTON, DELAWARE, A CORPORATION OF NEW JERSEY.

PROCESS OF CONDENSING GLYCERIN.

1,036,715.  Specification of Letters Patent.  Patented Aug. 27, 1912.

Application filed June 17, 1911. Serial No. 633,819.

*To all whom it may concern:*

Be it known that we, WILLIAM RINTOUL and ALFRED GEORGE INNES, subjects of the King of Great Britain, residing at Stevenston, Ayrshire, Scotland, have invented a new and useful Improvement in Processes of Condensing Glycerin, of which the following is a full, clear, and exact description, reference being had to the accompanying drawings, which form a part of this specification.

Our invention relates to certain improvements in the process for the production of so-called condensed glycerin.

By condensed glycerin is understood the condensation and simultaneous dehydration of some or all of the molecules of glycerin in groups of two, three or more, with formation of molecules of any or all of the following, viz: diglycerin, triglycerin, tetraglycerin, and higher products of condensation.

The present invention contemplates two distinct steps in the treatment of glycerin—the said steps being advantageously combined—of which the first has for its object the avoidance of certain drawbacks attendant on previous processes referred to below, and the second has for its object the acceleration of the reaction of condensation by effecting the removal of the water as fast as it is liberated.

Heretofore glycerin has been condensed by heating it to its boiling point (275° C. to 295° C.) with or without the addition of such substances as caustic soda or sodium acetate, any vaporized glycerin being caused to flow back through a cooling arrangement while the water vapor is allowed to escape. Now, under these conditions the drawback is encountered that the condensation is accompanied by a partial decomposition of the glycerin. The condensed glycerin so formed is unsuitable for the manufacture from it of nitric esters, inasmuch as the nitrated product is very difficult to wash, dry and stabilize, by reason of the readiness with which it forms slimy emulsions with water. It has also been proposed to conduct the operation of condensation at a somewhat reduced temperature in a vacuum vessel from which atmospheric oxygen is excluded, but even this alternative method is troublesome, slow, and requires complicated apparatus. We have discovered that this can be effected by heating the glycerin at ordinary pressures to temperatures lower than the boiling point. We have discovered that the action will proceed at all temperatures between 200° C. or even lower and 275° C., without any of the drawbacks referred to.

At the lower temperatures at which we carry out the reaction larger quantities of soda, sodium acetate, etc., may be employed without risk of unduly decomposing the glycerin; whereby the reduction of the velocity of reaction due to the lower temperature is compensated for. In order to accelerate this reaction by removing the water liberated as fast as it is formed, we bring in contact with the hot glycerin a stream or streams of air or carbon dioxid or other suitable gas or vapor. At lower temperatures air can be employed without undue decomposition of the glycerin. At higher temperatures up to and including the boiling point, it is preferable to employ some suitable gas or vapor having no oxidizing tendency, such, for instance, as carbon dioxid. This, the second step of the process can be adopted with advantage, whether the glycerin be condensed at its boiling temperature, as in previous processes, or at temperatures below this, as in our improved process.

An apparatus with which this process may be carried out and which apparatus is claimed in a separate application, filed by us, is illustrated in the accompanying drawing in which a sectional view of said apparatus is shown.

$a$ is a metallic vessel preferably surrounded or covered with heat insulating material $b$. $c$ is a steam coil in the interior of this vessel.

$d$ is the steam inlet to the coil, and $e$ the steam outlet. $f$ is a pipe, having the stopcock $g$, for the admisison of the glycerin, to be treated, into the interior of the vessel, and $h$ is the outlet pipe for the treated glycerin, said outlet pipe having the valve $i$.

$j$ is a gas inlet leading to the perforated rings $k$ at or near the bottom of the vessel.

$l$ is a thermometer for determining the temperature.

$o$ is an exit through the cover of the vessel for the gases and vapors to escape, which exit may be connected with a return cooler (not shown).

In practice the glycerin is admitted through the pipe *f* in measured quantities sufficient to fill and maintain the liquid in the vessel *a* at a proper level, and steam is admitted through the steam inlet at proper pressure and temperature to maintain the temperature in the coil *c* at the proper temperature, and gas or vapor is admitted through the gas inlet and escapes through the perforations in the rings *k*. The gas or vapor after action on the glycerin passes out of the apparatus through the pipe *o*. The treated glycerin escapes through the pipe *h*.

Having now described our invention what we claim and desire to secure by Letters Patent of the United States is:—

1. The hereinbefore described process of condensing glycerin, which consists in heating the glycerin to be condensed to a temperature lower than the boiling point of the glycerin, and during said treatment removing the water liberated as formed by bringing a stream or streams of a vapor in contact with said glycerin.

2. The hereinbefore described process of condensing glycerin, which consists in heating the glycerin to be condensed, and during said treatment removing the water liberated as formed by bringing a stream or streams of a vapor in contact with said glycerin.

3. The hereinbefore described process of condensing glycerin, which consists in heating the glycerin to be condensed to a temperature lower than the boiling point of the glycerin, and during said treatment removing the water liberated as formed by bringing non-oxidizing vapor in contact with said glycerin.

4. The hereinbefore described process of condensing glycerin, which consists in heating the glycerin to be condensed, and during said treatment removing the water liberated as formed by forcing non-oxidizing vapor through said glycerin.

5. The hereinbefore described process of condensing glycerin, which consists in heating the glycerin to be condensed to a temperature lower than the boiling point of the glycerin, and during said treatment removing the water liberated as formed by forcing carbon-dioxid vapor through said glycerin.

6. The hereinbefore described process of condensing glycerin, which consists in heating the glycerin to be condensed, and during said treatment removing the water liberated as formed by forcing carbon-dioxid vapor through said glycerin.

7. The hereinbefore described process of condensing glycerin, which consists in heating the glycerin to be condensed to a temperature lower than the boiling point of the glycerin, and during said treatment removing the water liberated as formed by forcing a stream or streams of a vapor through said glycerin.

8. The hereinbefore described process of condensing glycerin, which consists in heating the glycerin to be condensed, and during said treatment removing the water liberated as formed by forcing a stream or streams of a vapor through said glycerin.

9. The hereinbefore described process of condensing glycerin, which consists in heating the glycerin to be condensed to a temperature lower than the boiling point of the glycerin, and during said treatment removing the water liberated as formed by forcing non-oxidizing vapor through said glycerin.

10. The hereinbefore described process of condensing glycerin, which consists in heating the glycerin to be condensed, and during said treatment removing the water liberated as formed by forcing non-oxidizing vapor through said glycerin.

In testimony of which invention, we have hereunto set our hands, at Glasgow, on this 23rd day of May, 1911.

WILLIAM RINTOUL.
ALFRED GEORGE INNES.

Witnesses:
WALLACE CRANSTON FAIRWEATHER,
JOHN MCCLEARY.